Nov. 12, 1968      A. LOHR ETAL      3,410,198
                   MEAT-TURNING DEVICE
Filed May 23, 1967                   3 Sheets-Sheet 1
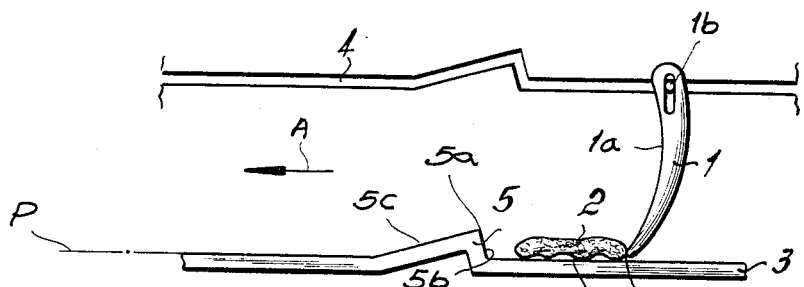
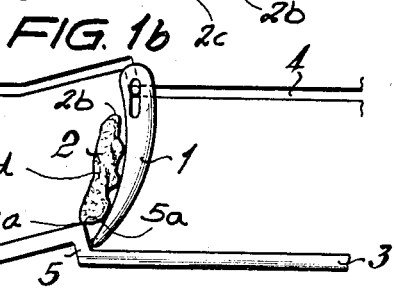
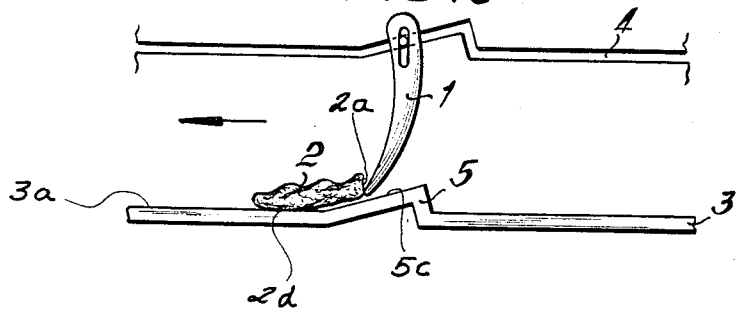
INVENTORS:
Alfred Löhr
Helmut Hemmann
Karl Tropp
BY Karl J. Ross
        Attorney INVENTORS:
Alfred Löhr
Helmut Hemmann
Karl Tropp BY Karl J. Ross
Attorney Nov. 12, 1968   A. LOHR ETAL   3,410,198
MEAT-TURNING DEVICE
Filed May 23, 1967   3 Sheets-Sheet 3
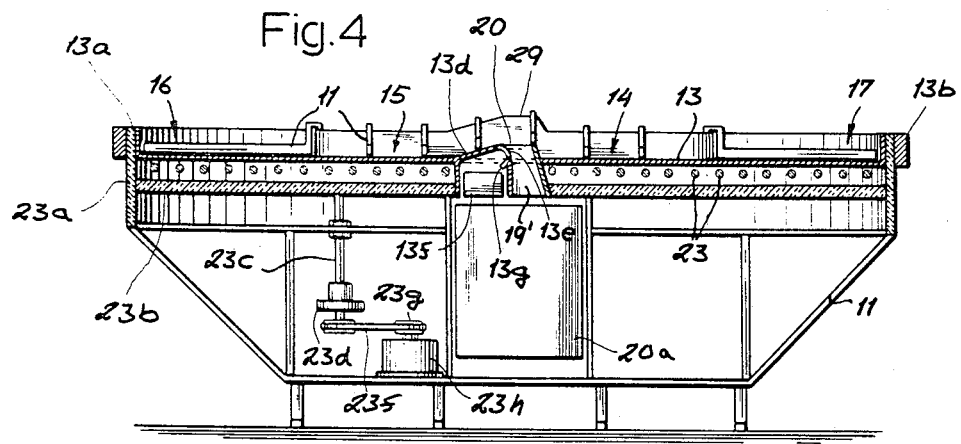
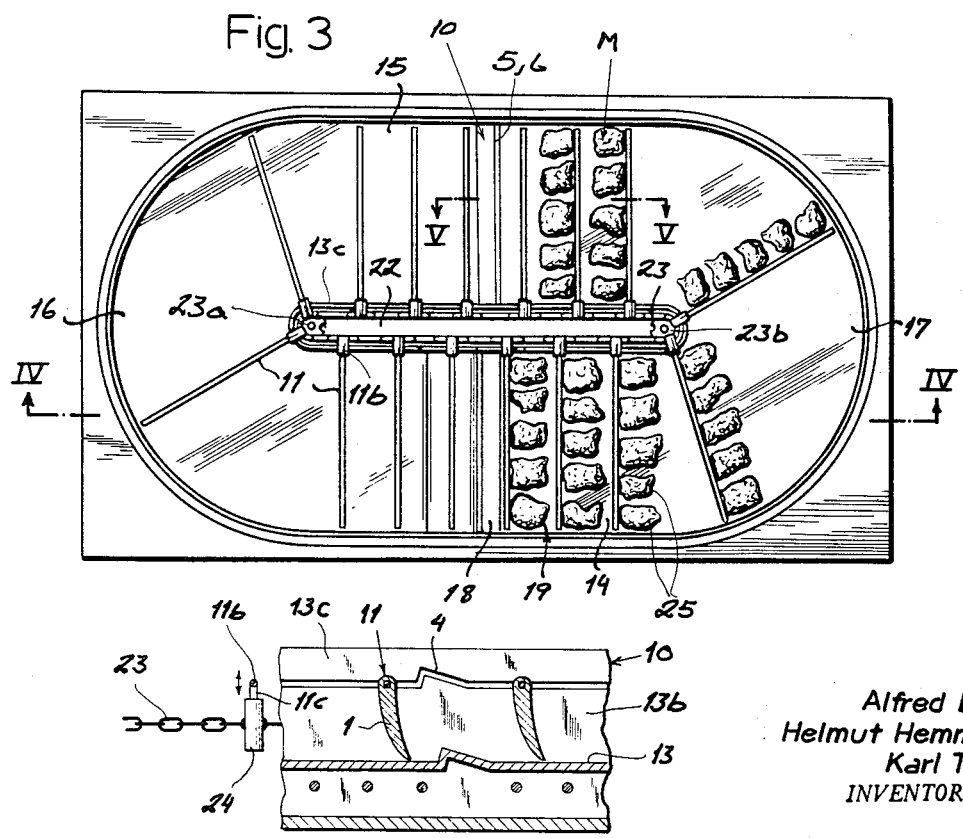
Alfred Löhr
Helmut Hemmann
Karl Tropp
INVENTORS.
BY Karl J. Ross
Attorney United States Patent Office
3,410,198
Patented Nov. 12, 1968

3,410,198
MEAT-TURNING DEVICE
Alfred Lohr and Helmut Hemmann, Herborn, and Karl Tropp, Werdorf, Germany, assignors to Burger Eisenwerke Aktiengesellschaft, Wetzlar, Germany, a corporation of Germany
Filed May 23, 1967, Ser. No. 640,533
Claims priority, application Germany, May 25, 1966, B 87,281
10 Claims. (Cl. 99—423)

ABSTRACT OF THE DISCLOSURE

Apparatus for the turning, during cooking, of flat portions of meat wherein the comestible is advanced along a heated surface by a pusher, and at least one step is formed in the surface at an intermediate location and has a flang engageable with the leading edge of each portion of meat advanced by the pusher for temporarily retaining the leading edge whereby continued advance of the pusher flips the trailing edge of the respective portion about its leading edge.

---

Our present invention relates to a turning device for comestibles adapted to be cooked on one side and flipped over at an intermediate point in the cooking process for further treatment on the other side.

The serial roasting, broiling, etc. of relatively flat meat portions (e.g. chopped meat patties, cutlets, filets) is presently common in institutional cooking and in other systems in which a series of flat meat portions are displaced along a substantially continuous transport path and are subjected to heating therealong. In cases in which the heating means includes a relatively flat plate along which the meat portions are drawn, it is necessary to provide either a second heating arrangement above the transport path or a turning or flipping arrangement for switching the surface of meat contacting the heated plate.

In our concurrently filed copending application Ser. No. 640,535, entitled, "Apparatus for the Frying or Roasting of Comestibles," we describe and claim an apparatus for the serial frying, roasting or broiling of pieces of meat or the like which are drawn along an endless annular transport path by a plurality of pusher arms or flights cantilevered at one side of this path and extending athwart the latter. The endless transport path is defined by a plate, heated from below, which lies in a horizontal plane and supports one face of the portion of meat as it is continuously entrained around the path. In that system, a highly compact and convenient installation was obtained by subdividing the roasting or frying surface into two generally straight parallel sections which were joined at their ends by a pair of semicircular sections to impart a generally oval configuration to the path. Approximately midway along one of these sections, an exit ramp is provided for discharging the roasted or fried objects and substantially midway along the other straight section, a turning device flips over the pieces of meat. A turning device of that type is described and claimed in our commonly assigned concurrently filed copending application Ser. No. 640,533, entitled, "Serial Roasting Apparatus with Product Turner." In the continuous roasting system, the flights or pusher arms are entrained by an endless chain, preferably running along the inner wall of the annular path, and are vertically shiftable to enable them to follow the discharge ramp and to advance the portions of meat over a fat-collection pan through an outlet opening across the transport path into a receptacle. Uncooked meat is placed upon the heated plate for engagement with the continuously moving flights just ahead of this opening. The heated plate may be provided with walls along both sides of the transport path to define with the plate a compartment for the cooking fat, while level-equalizing means connects the trough on both sides of the ramp to ensure identical liquid levels of cooking fat on both sides.

It may be noted that essentially all prior art meat-turning arrangements have been characterized by difficulties in cleaning the apparatus, complicated structures and breakdown-prone mechanisms for flipping the portions of meat.

It is, therefore, an important object of the present invention to provide a relatively simple and easily cleaned device for the flipping or turning of portions of a comestible, (e.g. meat patties, cutlets and filets) which is free from the disadvantages characterizing earlier devices, uses a minimum of moving parts, and is particularly adapted for use in systems for the continuous roasting, broiling and frying of meat drawn along heated plates.

A further object of this invention is to provide a turning device for a continuous roasting or frying apparatus of the character set forth in the aforementioned applications, which is of simplified construction, is easier to clean than most earlier turning devices, and is of relatively inexpensive construction.

These objects and others which will become apparent hereinafter, are attained in accordance with the present invention by providing, in an apparatus of the general character described, and in combination with a heated plate along which the portions of meat are displaced, a turning device which comprises a step formed in the heated plate and engageable with a leading edge of the portions of meat, while a pusher arm, bar or other element depends from above to engage the trailing edge of the portion and advance it past this step. The pusher arm advantageously has an upwardly extending flank along which the trailing edge of the portion of meat is guided when the leading edge thereof is temporarily retained by the step. The step and the pusher arm may extend athwart the transport path for simultaneous turning of a row of pieces of meat when such rows are advanced simultaneously along the transport plate.

According to a specific aspect of this invention, the pusher arms are vertically movable so as to follow the contours of the heated plate and thus of the step whereby no substantial stress is applied to the pusher arm when it passes over this step.

Yet another feature of this invention resides in the provision of a step which projects upwardly from the plane of the heating surface and has a relatively steep flank engageable with the leading edge of the portions of meat in the direction of advance thereof, and a further flank of relatively shallow inclination down which the meat is led after it has been flipped. Alternatively, the step can be recessed in the heating plate and formed as a notch or crevice thereagainst behind a shallowly inclined ramp whose edge forms a pivot for the portions of meat. In this case, the descending leading edge engages a flank of the notch and can be flipped by the pusher arms.

The above and other objects, features and advantages of the present invention will become more readily apparent from the following description, reference being made to the accompanying drawing in which:

FIGS. 1a–1c are diagrammatic side-elevational views of a turning device according to this invention;

FIG. 3 is a plan view of a meat-roasting or frying apparatus embodying this invention;

FIG. 4 is a cross-sectional view taken generally along the line IV—IV of FIG. 3;

FIG. 5 is a detail view along the line V—V of FIG. 3 drawn to an enlarged scale.

Figure 2A:
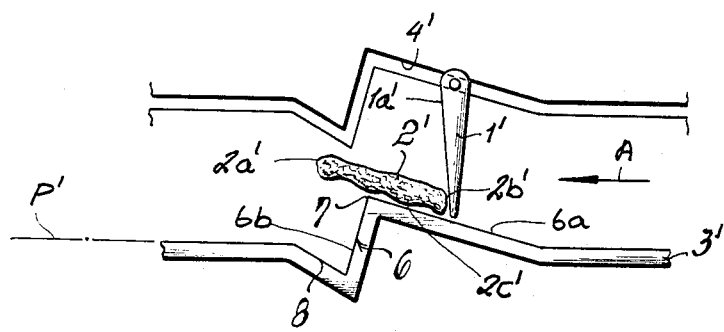
FIGS. 2a–2c are similar views of a modification in several operative positions.

In FIGS. 1a through 1c of the drawing, we have diagrammed one embodiment of a meat-turning system in which the pieces of meat 2 are advanced along a heated roasting or frying surface or plate 3 by a scoop-shaped pusher arm 1 in the direction of arrow A. The plate 3 may form a continuous or endless transport path as, for example, illustrated and described at 13 in connection with FIGS. 3 through 5 and in our commonly assigned copending application Ser. No. 640,535. The scoop-shaped arms 1, which are displaced continuously by a chain or other drive, have forwardly concave surfaces 1a in the direction of movement A and are guided in a camming slot or rail 4 via their sliders 1b so as to move parallel to the plate along the contours thereof. The plate 3 is heated from below by a plurality of spaced-apart electric resistance heaters (FIGS. 3 and 4) and is provided, at the meat-turning region, with a step 5 extending transversely of the transport path, i.e. athwart the latter. The step 5, which rises out of the support plane P, has a turning edge 5a above the plane P and a steep flank 5b engageable with the leading edge 2a of each portion 2 of meat advanced by the spaced-apart pusher arms 1 in the direction A. Downstream of the steep flank 5b, the step 5 is provided with a flank 5c of relatively shallow inclination along which the portions 2 of meat are guided into the plane P for further roasting.

As illustrated in FIG. 1a, the pusher arms 1 engage the trailing edges 2b of each portion 2 of meat, which is browned along its underside 2c until the leading edge 2a abuts the steep flank 5b of the step 5.

Continued movement of the pusher 1 in the direction of arrow A (FIG. 1b) causes the trailing edge 2b of the impeded portion 2 to ride up the concave face 1a of the pusher as the leading edge 2a turns about the ridge 5a of the step 5.

The momentum of the portion 2, still entrained by the arm 1, causes the meat portion to flip about this edge 5a and falls (FIG. 1c) onto its other side 2d; as it descends along the ramp 5c for browning as it is entrained at its edge 2a by the pusher 1 along the further stretch 3a of the heating plate 3.

Figure 2B:
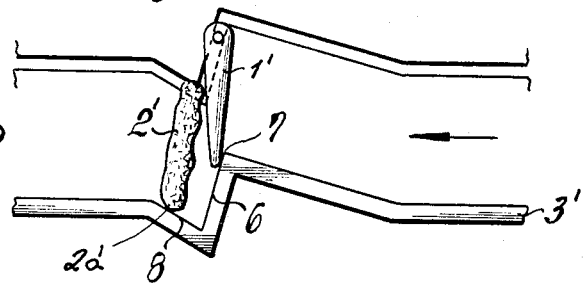
Figure 2C:
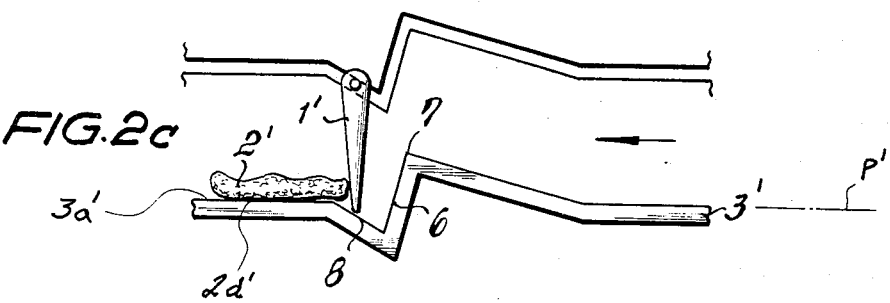

In the modification of FIGS. 2a through 2c, the step 6 is recessed below the plane P' of the heating surface 3' and has a flank 8 of the resulting ridge engageable with the leading edge 2a' of the portion 2' of meat advanced by the pusher 1' in the direction of arrow A'. A shallow ramp 6a rises from the plane P' to a pivoting edge 7 extending athwart the transport path and demarcating the separation between the shallowly inclined ramp 6a and a steep flank 6b of the step. The flank 8 is disposed in the path of the leading edge 2a' of the lead portion 2' as it flips over the edge 7 (FIG. 2b). The pusher arm 1' of this embodiment is also guided in a camming slot 4' and may be driven by a chain or the like (FIGS. 3 through 5) but has a forward face 1a' extending perpendicularly to the heating plate 3'.

The meat cooked along its underside 2c' (FIG. 2a), is advanced in the direction A' until it overhangs the edge 7. Further entrainment of the trailing edge 2b' by the arm 1' causes the portion of meat to tilt about this edge (FIG. 2b) and brings the leading edge to 2a' into engagement with surface 8. Continued advance of the pusher 1' flips the portion 2' of meat about its leading edge onto the downstream portion 3a' of the plate 3' for broiling, roasting and frying along its underside 2d'. Since all of the surfaces of the steps of the turning device are flat, and the flanks of the steps are inclined substantially at a right angle to one another, cleaning is facilitated and the device can be produced inexpensively.

In FIGS. 3 through 5, we show a system of the type described in detail in FIGS. 1a through 1c as employed in an apparatus for the frying and roasting of large numbers of portions of meat. In this apparatus, the flat meat is arrayed in rows M extending transversely of the roasting or frying surface 13 which forms, with an outer wall 13a, a fat-retaining trough whenever the device is employed for frying. Spaced below the heating surface 13, which is mounted upon a support frame 11, there is provided an array of spaced-apart parallel resistant heaters 23 which are received in a compartment 23a defined between the surface 13 and a wall 23b of heat-resistant ceramic material. The outer housing wall 13a, which is reinforced with a peripheral ring 13b, likewise may be of a heat-resistant material.

The heated surface 13 defines an annular, endless, generally oval transport path which can be viewed as having a pair of relatively straight portions 14 and 15 which are parallel to one another but transversely spaced and are joined at their ends by a pair of semicircular or sectoral portions 16 and 17. Approximately midway along the straight portion 14, we provide a discharge station 18 (which is described and illustrated in greater detail in the aforementioned copending application Ser. No. 640,535) ahead of which is located the input station 19 at which the flat servings 25 of meat are placed upon the surface 13. On the opposite side of the apparatus and substantially midway along the straight portion 15 of the transport path, we provide a turning station generally designated 10 and consisting of the step 5 etc. described and illustrated in FIGS. 1a through 1c, or the step 6 of FIGS. 2a through 2c.

In a clearance 22, between the sections 14 through 17 and surrounded thereby, an endless chain 23 passes about sprockets 23a and 23b, while being driven by a shaft 23c via a clutch 23d, a driven pulley 23e, a belt 23f and a driving pulley 23g of an electric motor 23h. Above the clearance 22, there may be provided suction hood to draw contaminants, dust and the like away from the drive mechanism.

As described in the aforementioned copending applications, the conveying means includes vertically extending sleeves 24 (FIG. 5) spaced along the chain 23 and entrained thereby along the inner side of the transport path. The chain may pass between a pair of guide channels for support. Each flight, generally designated 11, constitutes the pusher 1 for each row M of the articles to be roasted, the pusher 1 being in the form of a scoop-shaped horizontal arm extending athwart the transport path and cantilevered by a shank 11b turned about the wall 13b along the inside periphery of the transport path. The legs 11c of the pusher members 11 are vertically shiftable within the respective sleeve 24. The sleeve 14 and the respective leg 11c are of mating prismatic configuration to permit vertical movement of the flight without relative rotary movement of sleeve and flight. The flights 11 can be replaced for cleaning by simply receiving them from the respective sleeve 14 and are easily interchangeable with, for example, scraper members or the like designed to clear the surface 13 of any accumulated waste or by pushers of the type illustrated at FIGS. 2a through 2c.

At the discharge station 18, the flights 11 ascend a ramp 29 forming a guide surface on the inner wall 13c which parallels the ramp 13d. Ascending from the heating surface 13 to an opening 20 above the level of the heating surface, the ramp 13d terminates at its upper end in a grill 13e at which excess fats and juices are drained into a collecting pan 13f via an apron 13g. At the discharge side of the ramp 13d, there is provided the opening 20 which extends across the transport path and is formed by a chute 19' through which the pieces of meat 15, after they have been fried or roasted on both sides, pass into a receptacle 20a. Forwardly of the opening 20, the flight-control surface of the wall 13c has a descending flank to bring each flight 11 behind each row M of fresh meat to be advanced along the transport path.

After the pieces of meat have been roasted along one side, they enter the turning station 10 (FIGS. 3 and 5) at which they are flipped over for roasting and frying on their other side as described in connection with FIGS. 1a through 1c. At this station, the plate 13 is formed with the step 5 and cooperates with the scoop-shaped pushers 1 which are guided in the camming group 4 in the wall 13c. From the turning station 10, the flipped portions of meat are roasted or fried on their opposite sides and carried to the discharge opening 20.

Otherwise the apparatus is constructed and operated as described in the aforementioned copending applications.

The invention described and illustrated is believed to permit of many modifications within the ability of persons skilled in the art, all such modifications being considered within the spirit and scope of the appended claims.

We claim:

1. In an apparatus for the cooking of flat portions of a comestible wherein the comestible is advanced along a heated surface, the improvement which comprises turning means for flipping each portion at an intermediate location along said surface, said turning means comprising pusher means shiftable, along said surface for entraining said portions therealong, and at least one step formed in said surface at said location and having a flank engageable with the leading edge of each portion advanced by said pusher means for temporarily retaining the leading edge whereby continued advance of said pusher means flips the trailing edge of the respective portion about its leading edge.

2. The improvement defined in claim 1 wherein said heating surface is generally planar and said step rises from said surface with a relatively steep flank engageable with the leading edge of successive portions.

3. The improvement defined in claim 1 wherein said surface is generally planar and said step is in part recessed below the plane of said surface and is formed with an edge rearwardly of the recessed portion of said step about which the portion of the comestible entrained by said pusher means is tilted downwardly.

4. The improvement defined in claim 1 wherein said pusher means includes a generally scoop-shaped pusher member extending transversely of the direction of movement thereof.

5. The improvement defined in claim 1 wherein said pusher means includes a succession of pusher arms spaced along said surface, and guide means at said location for constraining said arms to follow the contours thereof.

6. The improvement defined in claim 5 wherein said surface is substantially horizontal and defines an annular transport path, said pusher means including an endless chain displaceable along said path, and a plurality of flights carrying said arms and successively sweeping along said path for transporting successive pieces of the comestible therealong.

7. The improvement defined in claim 6 wherein said surface and transport path are formed with a pair of equispaced parallel straight sections and a pair of arcuate sections interconnecting said straight sections at the ends thereof, said location lying substantially midway along one of said straight sections.

8. The improvement defined in claim 7, further comprising a discharge station located substantially midway along the other of said straight sections for removing said portions of the comestibles from said surface, said discharge station being provided with an opening spaced above said surface and extending across said path, and a ramp rising from said surface to said opening, said arms being vertically shiftable relatively to said surface for following the inclination of said ramp and the contour of said step.

9. The improvement defined in claim 8, further comprising heating means including a multiplicity of electric-resistance heaters disposed below said surface for heating same.

10. The improvement defined in claim 8 wherein said chain is disposed centrally of said annular transport path and along the inner periphery thereof.

References Cited

UNITED STATES PATENTS 2,191,284    2/1940    Morris _____ 99—405 XR

FOREIGN PATENTS 84,204    9/1954    Norway.

WALTER A. SCHEEL, *Primary Examiner.*

J. NEARY, *Assistant Examiner.*